May 30, 1939.  J. M. SINGER  2,160,039
METHOD OF MAKING BICYCLE FORKS
Filed Nov. 18, 1936
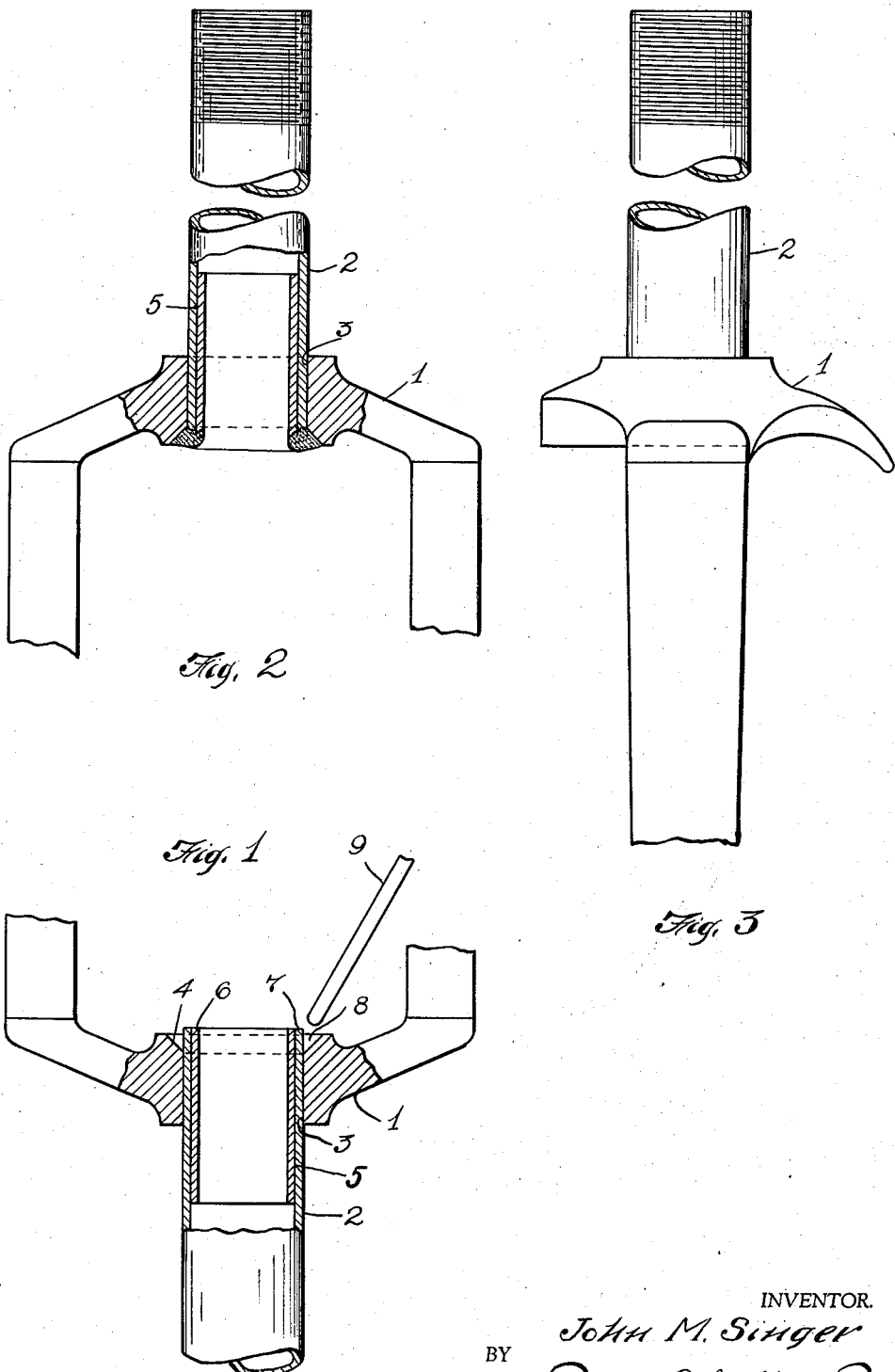
INVENTOR.
John M. Singer
BY
Pray, Oberlin & Pray
ATTORNEYS.

Patented May 30, 1939

2,160,039

UNITED STATES PATENT OFFICE 2,160,039

METHOD OF MAKING BICYCLE FORKS

John M. Singer, Cleveland, Ohio, assignor to The Cleveland Welding Company, Cleveland, Ohio, a corporation of Ohio Application November 18, 1936, Serial No. 111,464

4 Claims. (Cl. 29—176)

This invention relates as indicated to bicycles but has reference more particularly to the fork of such bicycles and to a novel method of joining the component parts of such forks.

An object of the invention is to provide a bicycle fork of extremely rigid, rugged and substantially unitary construction.

Another object of the invention is to provide a novel method of uniting the fork post with the fork brace to form the aforesaid bicycle fork.

To the accomplishment of the foregoing and related ends, said invention, then, consists of the means and steps hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:

Fig. 1 is a view, partly in section and partly in elevation, showing the parts in assembled relation preparatory to the welding of the fork post tube to the fork brace; Fig. 2 is a view similar to Fig. 1 but showing the finished product; and Fig. 3 is a fragmentary side elevation of the fork shown in Fig. 2.

Referring more particularly to the drawing, the fork is seen to comprise a fork brace 1 and a fork post 2, these parts being formed of the conventional materials used in bicycle manufacture. The brace 1 has an opening 3 therein and is beveled as at 4 at the inner end of this opening. The tube 2, which forms the post, is designed to enter and snugly fit at its corresponding end within opening 3. Such tube 2 further has press-fitted within the end in question a reinforcing insert in the form of a short tube 5, the outer end 6 of which is substantially flush with the adjacent end 7 of the tube 2.

In assembling the parts preparatory to permanently uniting them, the end of the tube 2, which carries the reinforcing insert, is inserted with a press fit into the opening 3 in the brace and to such extent that the ends 6 and 7 project slightly beyond the beveled surface 4 of the brace, as shown in Fig. 1. With the parts thus positioned, an annular cavity or recess 8 is provided between the beveled surface 4 of the brace and the outer surface of the end of the tube 2.

The tube 2 and reinforcing insert 5 are then arc-welded or gas-welded to the brace, either with or without the use of additional welding metal.

In arc-welding with the use of additional welding metal, a metallic electrode or weld rod 9 is used in the manner shown in Fig. 1 to interfuse portions of the ends 6 and 7 of the reinforcing insert and tube, respectively, the fused metal, together with portions of the beveled wall of the recess, as well as some metal derived from the melting of the weld rod itself, flowing into the cavity or recess 8 and substantially filling the same, as shown in Fig. 2. The tube, insert and brace are thus simultaneously united by a fusion joint, thereby producing a fork of extremely rigid, unitary construction, and obviating the necessity of first securing the reinforcing insert to the post tube or the post tube to the brace in any other manner than by snug fits.

In arc-welding without the use of additional welding metal, a carbon electrode is employed instead of the metallic electrode or weld-rod, and in such case, the ends 6 and 7 of the reinforcing insert and post tube are desirably caused to project above the beveled surface 4 of the brace to an extent somewhat greater than that shown in Fig. 1, in order that insert and tube may themselves provide sufficient metal to fill the annular recess 8.

That a welded joint as described may be formed by means of a gas welding torch, with or without the use of additional welding metal, will be readily apparent to those skilled in this art.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I, therefore, particularly point out and distinctly claim as my invention:

1. The method of making a bicycle fork which comprises providing a fork brace having an opening therein which extends entirely therethrough, inserting a post tube having a tubular reinforcement in one end thereof in such opening in such a manner as to cause portions of said tube and reinforcement to project beyond said opening, and then interfusing said portions of said tube and reinforcement with the adjacent portion of the brace.

2. The method of making a bicycle fork which comprises providing a fork brace having an opening therein, inserting a post tube having a tubular reinforcement in one end thereof in such opening in such a manner as to cause portions of said tube and reinforcement to project beyond said opening to form with an adjacent wall of the brace an annular recess, and interfusing said portions of said tube and reinforcement with said wall of the brace by means of an electric welding arc.

3. The method of making a bicycle fork which comprises providing a fork brace having an opening therein, inserting a post tube having a tubular reinforcement in one end thereof in such opening in such a manner as to cause portions of said tube and reinforcement to project beyond said opening to form with an adjacent wall of the brace an annular recess, and interfusing said portions of said tube with said wall of the brace while supplying additional weld metal to fill said recess.

4. The method of making a bicycle fork which comprises providing a fork brace having an opening therein and a beveled surface adjacent one end of said opening, inserting a post tube in such opening in such a manner as to cause a portion of said tube to project beyond said opening to form with said beveled surface an annular recess, and depositing weld metal in said recess to thereby permanently join said tube with said brace.

JOHN M. SINGER.